Figure 1:
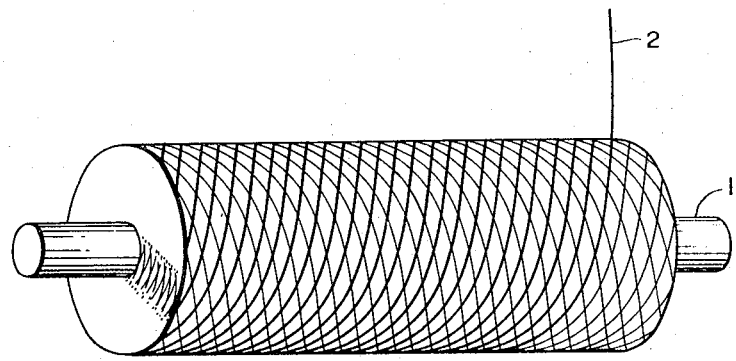

United States Patent  [11] 3,622,412

[72] Inventors William C. Ross
Winchester;
Nathaniel M. Edmands, Jr., Lynn;
Frederick E. Heinemann, Canton, all of Mass.
[21] Appl. No. 873,788
[22] Filed Nov. 4, 1969
[45] Patented Nov. 23, 1971
[73] Assignee W. R. Grace & Co.
Cambridge, Mass.

[54] METHOD OF COVERING VOLUME-COMPRESSIBLE ARTICLES
6 Claims, 3 Drawing Figs.

[52] U.S. Cl. .................................................. 156/87, 29/132
[51] Int. Cl. ............................................. B32b 31/26
[50] Field of Search .......................................... 101/DIG.
10; 29/132; 156/87, 171, 172, 180, 183, 190

[56] References Cited
UNITED STATES PATENTS
3,061,887 11/1962 Clarke ..................... 264/317 X
3,090,106 5/1963 Raymond ..................... 29/132 X
3,100,676 8/1963 Christie ..................... 264/317 X Primary Examiner—Benjamin A. Borchelt
Assistant Examiner—Daniel A. Bent
Attorneys—William L. Baker, Metro Kalimon and C. E. Parker ABSTRACT: Volume-compressible products such as printing, coating, and impression rolls are made by enclosing a porous volume-compressible layer formed on a rigid core with an impermeable layer of heat-flowable resilient polymeric material. The assembly is wrapped with a nonshrinking tape, or may be placed in a mold. Vents plugged with a substance having a predetermined melting point are inserted in the porous layer, and lead to the atmosphere. Pressure to cause the polymeric coating layer to flow and consolidate is developed by heating the assembly. Cure, if necessary, is effected by elevating the temperature. At the higher temperature, the plugs melt and open the vent passages, thus avoiding collapse and wrinkling when the product cools.

PATENTED NOV 23 1971　　　　　　　　　　3,622,412

METHOD OF COVERING VOLUME-COMPRESSIBLE ARTICLES

This invention relates to the manufacture of volume-compressible products such as rolls useful as ink and printing rollers, rotogravure rolls, rolls for laminating, and surface decoration equipment.

All of these various rolls must exert some pressure on the paper or fabric which is passing through the nip or an ink-receptive surface such as type, lithoplate or engraving and "rubber" with its capacity for compression at the line of contact is desirable.

But solid rubber or its analogues are not a truly compressible substance. When pressure is applied, solid rubber merely distorts and some of the rubber adjacent the line of contact moves away. In printing, this fact has caused considerable difficulty. On a rotary press, what may be described as a standing wave in advance of the line of pressure builds up. As the rubber restores itself when it moves even a microscopic distance away from the line of contact, its restoring motion distorts the fine detail in halftone or type unless the pressures are very minimal, and the reduction in radius at the line of contact is very small. There are numerous other difficulties which result from this characteristic incompressibility which need not be elaborated here.

Attempts to overcome these difficulties have been made by producing rolls which essentially are three-part structures: (1) a rigid and usually metallic core and shaft; (2) a layer which is truly volume compressible, and (3) an outer surface layer or jacket which is smooth and very frequently compounded to be highly solvent resistant. The volume-compressible layer may be a layer of cellular rubber. Cellular rubber, however, while possessing the desired volume compressibility, often lacks the required resilience and the proper dimensional stability.

Recently, products of the above structure and useful, e.g., as printing rolls have been developed wherein the volume-compressible layer comprises an elastomer-fiber composite including within its mass sufficient free space so that there is no wave or moving hump to cause image distortion or significant surface speed differences between driver, driven roll or web. The air or other gas in this free space compresses volumetrically. Moreover, the products possess the desired resiliency and dimensional stability.

Two methods have been used to produce such a volume-compressible member. In one, the metallic core or shaft is covered with an elastomer-impregnated, porous, felted fibrous web, a sheet of which is coated on both sides with an adhesive, preferably heat curable, and spirally wound around the core until the desired thickness is built up. This layer, for example, may have a basis weight for the fiber portion alone of approximately 115 pounds per ream, a density of about 4, and typically may be impregnated with an equal weight of an acrylonitrile latex which is dried but only partially vulcanized. The usual method of producing such a condition is to dry the impregnated material and then heat it to 300—° F. for about 4 minutes. The sheet as applied to the rolls frequently has a firmness such that a pressure of at least 10 pounds per square inch must be exerted on the sheet to effect an initial compression of 2 mils and a residual porosity of at least about 37 percent at a compression of 4 mils. The wound layer is then subjected to heat to cure the adhesive. A layer of cellular rubber may be employed in addition to the impregnated sheet layer. This method is more fully described in U.S. Pat. No. 3,467,009 to Ross.

Another method of producing the dimensionally stable and volume-compressible member is to wind yarn on the core in a pattern predetermined to provide void spaces between each filament winding. For example, a continuous glass filament can be wound on the core, either in the form of a helix with spaced turns, or, following cop-winding practice, with angularly pitched turns. The yarns are wound a distance from one another and in successive layers, the yarns in one layer being disposed at an angle to the yarns in the next adjacent layer, thus forming spaces or voids in the built-up yarn structure. The yarn as it is wound on to the core is pulled through a bath of elastomer, e.g., natural or synthetic rubber, then through a set of wiping rolls set to squeeze the excess elastomer from the yarn. After curing, a porous, volume-compressible, dimensionally stable layer of elastomer-coated yarn results wherein the crossover points between the yarns are bonded by cured elastomer. In an alternative procedure, uncoated filament is wound as above on the core and the wound body dipped into a bath of latex, drained and cured. More accurate results are obtained, however, if the yarn is treated with elastomer before winding. A blowing agent can be included in the uncured elastomer to provide pores or cells in the cured elastomer which coats and bonds the yarns.

In both of the foregoing methods the volume-compressible, dimensionally stably layer is cured and usually ground to a smooth condition before the impervious surface covering or jacket is applied. The covering has been applied in a number of ways. For example, a thin layer of polyurethane elastomer in solution can be applied, dried, and ground to an essentially true round. The outer coating may also be formed by wrapping the surface of the volume-compressible portion with a sheet of raw uncured, compounded elastomer such as uncured neoprene rubber and the sheet then wrapped with wet fabric tape in the conventional manner. During subsequent heat curing, the wet tape compresses the softened sheet of elastomer causing it to flow and knit together into a uniform coating. The final layer is then ground to accurate size and surface finish.

We have found that winding the assembly with a wet tape which shrinks when the assembly is placed in the vulcanizing chamber and thus develops the necessary consolidating pressure on the rubber is not subject to accurate control. Sometimes the tapes are laid on irregularly. Then, mars or tape grooves appear on the surface of the roll. Sometimes the shrinkage is excessive and the volume-compressible layer beneath is changed in density.

We have found that it is possible to avoid these difficulties and make a volume compressible article which has substantially uniform density over its entire surface area, and also produce a surface which is so uniform that very little grinding is required. In carrying out my invention, we utilize a core and volume-compressible layer made in any one of the manners which have previously been mentioned. The entire periphery of the volume-compressible layer is enclosed by an impermeable layer of resilient polymeric material which softens and flows when heated, for example, uncured compounded rubber, and the enclosed assembly confined in any suitable manner against radial and longitudinal expansion. The confinement may be accomplished by wrapping, using relatively light tension, the polymer-enclosed, volume-compressible portion with paper or fabric tape. The enclosed assembly may also be confined by transferring the assembly to a mold having the proper configuration, for example, a cylindrical mold. Prior to heating, means for "venting" the volume-compressible layer to allow for passage of gas between the volume-compressible layer and the exterior of the impermeable layer during cooling are provided. This is accomplished by providing one or more passageways through the impermeable polymer coating, which passageways, for example, hollow tubes, are initially blocked by a small amount of a solid material, for example, a fused metal, which possesses a predetermined melting point. The entire assembly is then heated to cause the polymer layer to soften, flow and consolidate. Heating is then continued at an elevated temperature predetermined to melt the solid material and unblock the venting passageways. The polymer layer is then cured, if necessary, and the entire assembly allowed to cool.

This practice makes it possible to utilize the expansion of the gas in the pores of the volume-compressible layer to create the pressure needed for the flow and consolidation of the polymer covering, yet collapse or wrinkling of the roll due to any differential pressure created between the volume-compressible interior and the exterior of the roll when the heated roll is cooled, is avoided by venting the volume-compressible layer to the ambient atmosphere at the proper time.

As aforementioned, the porous, volume-compressible layer may be a layer of cellular rubber, a layer of fiber-elastomer composite as previously described, or any combination thereof. The polymeric covering is preferably a natural or synthetic rubber especially compounded to readily flow under the relatively light pressures developed during the heating stage. Ample time should be allowed for the rubber to flow during heating and for any trapped air in the covering rubber to diffuse before any cure of the rubber is initiated. We prefer to carry out the heating operation in a saturated steam vulcanizer. Using our preferred technique a compounded rubber possessing a low, less than about 20, Mooney viscosity at 200° F. and which does not show any substantial change in Mooney viscosity after 1 hour at this temperature, was found to adequately soften, flow and consolidate at a temperature of about 150° to 240—° F. in about 2 to 4 hours and fully cure in about 6 to 10 hours at a temperature of about 240° to 260° F.

Figure 2:
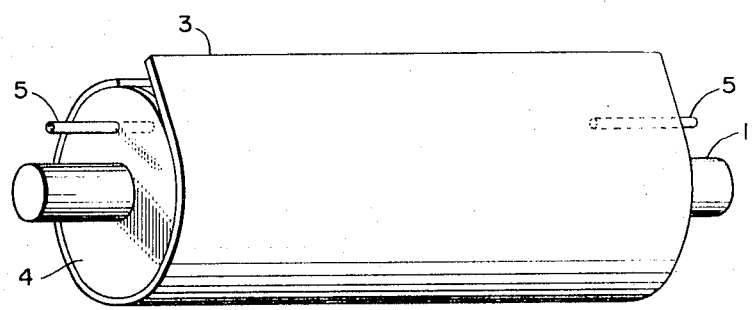
Figure 3:
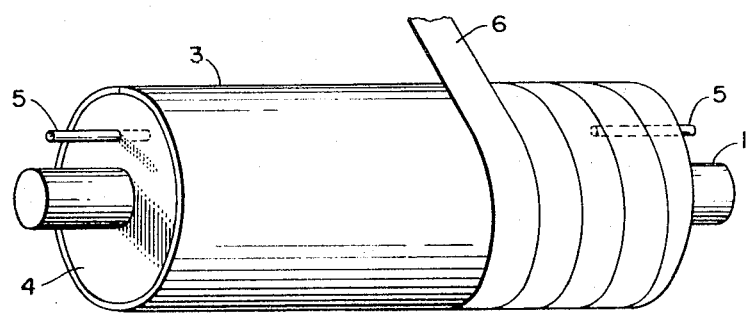

A detailed example of the process of our invention is given below with reference to the accompanying drawing wherein FIGS. 1, 2, and 3 are perspective views of a volume-compressible roll prepared and covered in accordance with our invention. The example is intended as illustrative only and should not be interpreted in any sense as limiting the scope of our invention.

EXAMPLE

A rubber composition having a Mooney viscosity of less than 20 at 200° —F. was compounded as follows:

| | Parts by Weight |
|---|---|
| Acrylonitrile-isoprene (Krynac 833*) | 100.0 |
| Sulfur | 2.5 |
| Stearic Acid | 1.0 |
| Antioxidant N-phenyl beta (naphthalene) | 1.5 |
| Carbon black (Kosmo 20) | 20.0 |
| Factice (Neophax D) | 24.4 |
| Dioctyl phthalate | 35.0 |
| Soya bean oil epoxide (Paraplex G 62) | 26.7 |
| Unsaturated fatty nitrile (Arneel S) | 10.0 |
| Zinc oxide | 5.3 |
| Benzothiaxyl Disulfide (MBTS) | 1.5 |

*Polymer Corp. Sarnia, Canada

The materials were milled together in the conventional manner and sheeted out to form a thin sheet.

To a roll core, 1, which was 78 inches long and 4.55 inches in diameter was wound, as shown in the accompanying drawing, consecutive layers of a fiberglass yarn, 2, (ECG 150–3/0) at a rate of 125 r.p.m. and an angle of 70° using a McClean-Anderson (Model W–L) filament winder (not shown). The space between adjacent parallel filaments in each layer was about 0.1 inch. The filaments in one layer were wound at an angle to the filaments in the next adjacent layer so that a built-up structure containing void spaces was obtained. Prior to winding, three coats of a neoprene rubber binder were applied to the yarn with drying in between each coat, the yarn after the final coating having a diameter of about 0.07 inch. The yarn was wound to a diameter of 6.19 inches, the amount of rubber binder (solids) deposited being 10,906 g. and the amount of glass yarn wound being 2,060 g. The porous, volume-compressible portion built up by winding the filament, 2, was cured at 280° F. for 4 hours, cooled to room temperature and ground to an essentially smooth surface and the ends trimmed to the desired length. The surface was then primed to insure bonding with the rubber sheet covering, 3, prepared above. At each end of the volume-compressible layer are placed one or more rings, 4, (FIG. 2) made from the uncured rubber sheet material prepared above. The rings are built up to the surface of the volume-compressible portion, 2, and one or more sheets of the uncured rubber, 3, are wrapped around the surface of the volume-compressible layer as shown in FIG. 2. Sufficient rubber is applied so that the diameter of the roll at this point is one-sixteenth to one-quarter inch over the desired finish diameter. Any excess rubber at the ends is removed. Any entrapped air between the plies of rubber is removed.

At each end of the roll one or more venting tubes, 5, are inserted through the rubber, 4, and into the volume-compressible layer. Each of the tubes is filled with a small amount of a fused metal, "Cerro Alloy 5400-1," having a melting point of 217° F. Each of the ends is wound under relatively high tension with wet cotton tape, 2 to 3 inches wide (not shown). The wet tape is built up to essentially the surface of the rubber covering 3. The use of the wet tape buildup on the ends gives especially strong restraining support to the end portions during curing. The vent tubes, 5, can extend through the tape covering, as shown, or terminate just beneath in the case where the layer of tape buildup is gas permeable.

The rubber face covering, 3, is then spirally wrapped with one or more layers of dry paper or cloth tape, 6, as shown in FIG. 3. The tape, 6, is applied snugly, yet less tension is employed than used to wrap the ends as described above.

The wrapped roll was placed in a steam vulcanizer and heated at a temperature of 200° F. for 2 hours to cause the uncured rubber covering portions 3 and 4, to flow and consolidate and to partially cure. The temperature was then raised to 240° F. and the roll cured for 6 hours. The roll was then allowed to cool. The fusible metal plugs in venting tubes 5, which had melted at 217° F. permitted air to flow between the volume-compressible portions and the ambient atmosphere outside of the impermeable rubber covering during cooling. After removal of the tape a uniform volume-compressible roll was obtained which showed no evidence of collapse or wrinkling of the exterior rubber covering.

The volume-compressible articles prepared using our process, e.g., rolls, may be used for ink rollers, damping rollers, coating rollers, or impression rollers. Their surfaces may be either dry or wetted with a variety of vehicles for the inks, colors, or coating materials. While we have mentioned vulcanizable rubbers as particularly suitable for use as the outer impermeable layer in our process, other resilient polymers which soften and flow upon heating such as thermoplastic polyurethanes, polyethylene, polyvinyl chloride, etc., may be used. In the case of such thermoplastic materials, sheets of extruded or calendered polymer can be applied to the compressible roll in the same manner as the vulcanizable rubber. Higher heating temperatures, depending on the particular polymer chosen, may be required to soften the plastic sufficiently and cause it to flow under the pressure from the expanding, entrapped gas so that a uniform, homogenous impermeable coating will result.

We claim:

1. A process of producing a cylindrical, volume-compressible article especially useful as a printing roll, said process including the steps of providing a rigid core, forming a porous, volume-compressible layer of an elastomer-fiber composite on the core, enclosing the said volume-compressible layer with an impermeable covering of vulcanizable rubber compound, confining the enclosed assembly against radial and longitudinal expansion by wrapping the enclosed assembly with paper or cloth tape, providing means to vent said porous, volume-compressible layer to the ambient atmosphere surrounding said enclosed, confined assembly comprising at least one hollow tube extending from said porous, volume-compressible layer and communicating with said ambient atmosphere, said tube having deposited therein an amount of a solid material having a predetermined melting point sufficient to prevent passage of gas enclosed within said volume-compressible layer therethrough, heating said enclosed, confined assembly to a temperature at least sufficient to cause said rubber to soften and flow and then heating the assembly to a temperature at which said solid material melts thereby opening said passageway and preventing collapse or wrinkling of the rubber covering as the article is cooled.

2. The process of claim 1 wherein said rubber covering is vulcanized prior to cooling of the article.

3. The process of claim 1 wherein said porous layer of elastomer-fiber composite is formed by winding an elastomer-coated filament on said core in a pattern predetermined to provide void spaces between the wound filaments and then curing the elastomer.

4. The process of claim 1 wherein said heating is carried out in steam-saturated atmosphere.

5. The process of claim 1 wherein said rubber has a Mooney viscosity at 200° F. of less than 20.

6. The process of claim 1 wherein the temperature employed to cause said rubber to flow ranges between about 150° and 250° F.